(12) United States Patent
Takeuchi

(10) Patent No.: US 8,908,059 B2
(45) Date of Patent: Dec. 9, 2014

(54) IMAGING APPARATUS AND IMAGING APPARATUS CONTROL METHOD FOR AUTOMATICALLY SETTING A FINISHING STATE OF A PHOTOGRAPH

(75) Inventor: Yoshitaka Takeuchi, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 451 days.

(21) Appl. No.: 13/208,081

(22) Filed: Aug. 11, 2011

(65) Prior Publication Data
US 2012/0044378 A1 Feb. 23, 2012

(30) Foreign Application Priority Data
Aug. 20, 2010 (JP) .................. 2010-185291

(51) Int. Cl.
H04N 5/235 (2006.01)
H04N 9/73 (2006.01)
H04N 5/228 (2006.01)
G03B 7/00 (2014.01)
H04N 5/232 (2006.01)

(52) U.S. Cl.
CPC ...................................... H04N 5/232 (2013.01)
USPC ...................... 348/222.1; 348/223.1; 348/362

(58) Field of Classification Search
None
See application file for complete search history.

(56) References Cited

U.S. PATENT DOCUMENTS 7,492,405 B2 * 2/2009 Shibutani ................. 348/333.01
2008/0088710 A1 * 4/2008 Iwamoto et al. ........... 348/220.1

FOREIGN PATENT DOCUMENTS

| CN | 1499823 A | 5/2004 |
|---|---|---|
| CN | 101790037 A | 7/2010 |
| JP | 2003-235050 A | 8/2003 |
| JP | 2006-238369 A | 9/2006 |
| JP | 2008-011413 A | 1/2008 |
| KR | 10-2003-0022072 A | 3/2003 |
| KR | 10-2008-0024449 A | 3/2008 |
| KR | 10-2008-0034410 A | 4/2008 |

OTHER PUBLICATIONS

Nikon Digital Camera D90 Users Manual; Dec. 31, 2008.

* cited by examiner

*Primary Examiner* — Albert Cutler
(74) *Attorney, Agent, or Firm* — Canon U.S.A., Inc. IP Division

(57) ABSTRACT

An imaging apparatus is capable of allowing a user of the apparatus to execute a photographing setting for implementing an expression of a photograph with the finishing requested by the user and for achieving a quality of an image which the user requested with a wide variety of expression ambiences even if the user is not very conversant with digital image processing. The user selects and executes three settings, such as the type of a scene to be photographed, a state of an object to be photographed, and a finishing. The photographing conditions and image processing parameters are set and executed in interlock with the selected settings. As a result, the imaging apparatus can implement the finishing of a photograph desired by the user.

3 Claims, 16 Drawing Sheets

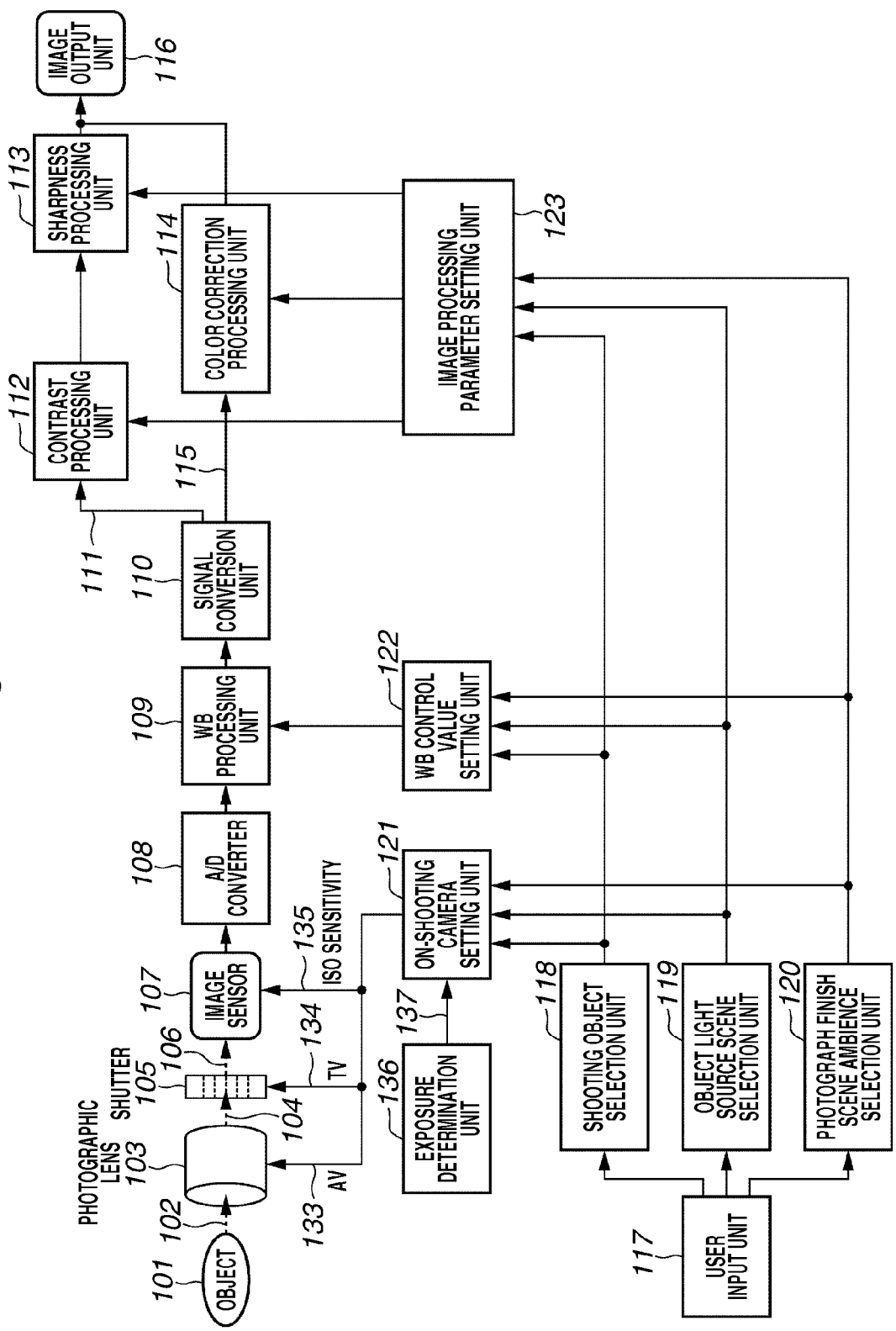

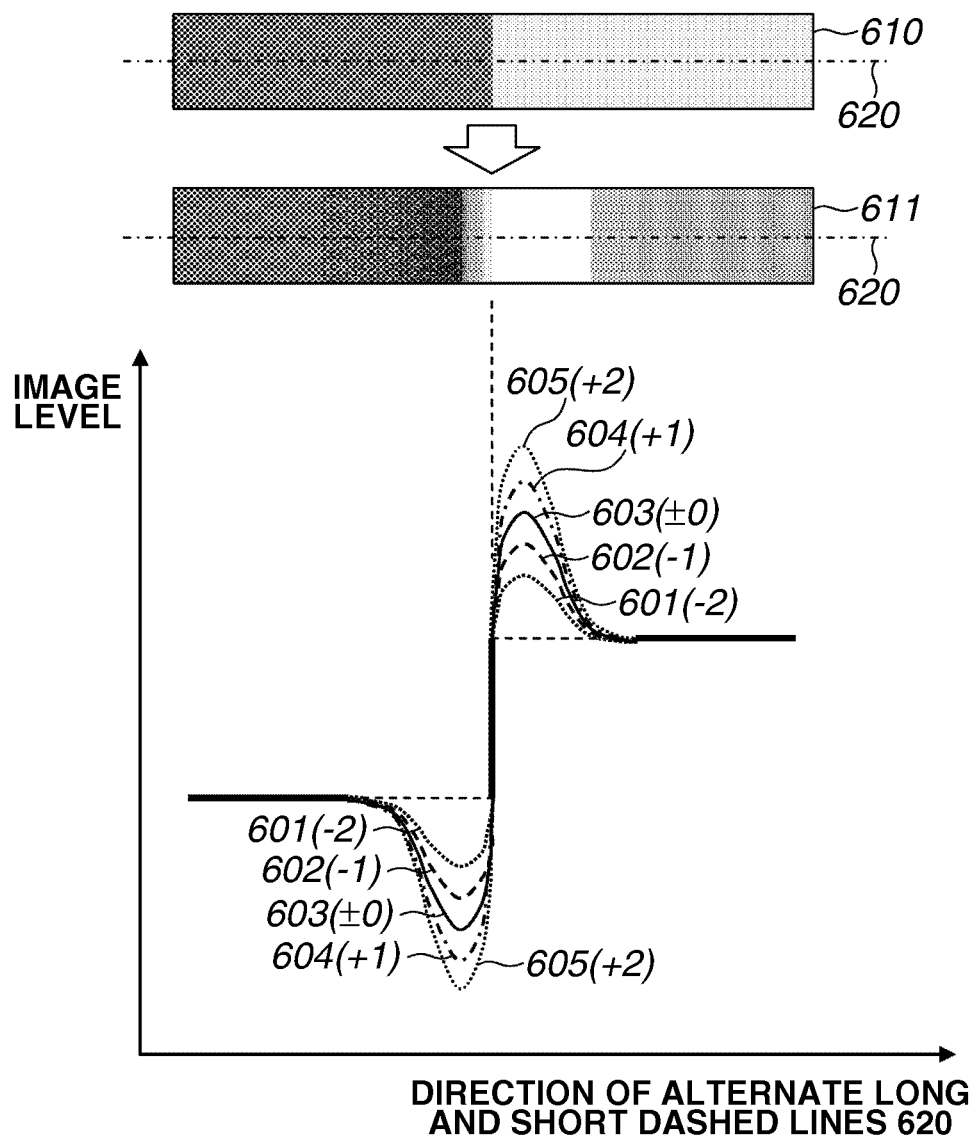

FIG.9A

| SELECT OBJECT TO BE PHOTOGRAPHED | MAIN OBJECT (ALTERNATIVES FOR USER SELECTION) |
|---|---|
| | STANDARD |
| | NATURE LANDSCAPE |
| | CITY LANDSCAPE |
| | SPORTS (LARGE NUMBER OF PARTICIPANTS) |
| | SPORTS (SMALL NUMBER OF PARTICIPANTS) |
| | PORTRAIT (LARGE NUMBER OF PERSONS) |
| | PORTRAIT (SMALL NUMBER OF PERSONS) |
| | CLOSEUP (OUTDOORS, FLOWERS AND PLANTS) |
| | CLOSEUP (INDOORS, STILL LIFE) |
| | VEHICLES |
| | ANIMAL |

FIG.9B

| LIGHT SOURCE (ALTERNATIVES FOR USER SELECTION) | COLOR TEMPERATURE SET TO WB PROCESSING UNIT (K) |
|---|---|
| FINE | 5000 |
| CLOUDY BUT BRIGHT | 5000 |
| CLOUDY AND DARK | 6000 |
| | 5000 |
| SHADOW ON FINE DAY | 7000 |
| | 5500 |
| SNOWSCAPE ON FINE DAY | 7000 |
| | 6000 |
| SHADOW ON SNOWY FINE DAY | 10000 |
| | 6000 |
| TWILIGHT | 2500 |
| | 5000 |
| MOONLIGHT | 8000 |
| | 3500 |
| FLUORESCENT LAMP | 4000~7000 (AUTO) |
| WHITE LED | 4000~7000 (AUTO) |
| TUNGSTEN FILAMENT LAMP | 3000 |
| | 5000 |
| MERCURY LAMP | 2000~7000 (AUTO) |
| | 5000 |
| FLAME (CANDLE OR BONFIRE) | 2000 |
| | 4000 |

SELECT OBJECT
LIGHT SOURCE SCENE

EXPRESSION METHOD
(USER SELECTS EITHER ONE FROM FOLLOWING ITEMS)
☐ FAITHFULLY REPRODUCE WHITE DOTS (UPPER FIELD OF EACH ITEM)
☐ USE EFFECT OF IMPRESSIVE COLOR (LOWER FIELD OF EACH ITEM)

FIG.10A

| FINISH AMBIENCE (ALTERNATIVES FOR USER SELECTION) | | CONDITION FOR CHANGING ON-SHOOTING CAMERA SETTING |
|---|---|---|
| | STANDARD | NOT TO BE CHANGED |
| | CLEAR AND SHARP | AV: F8 OR HIGHER |
| | SOFT AND GENTLE | SHIFT AE RESULT BY +1 EV, AV: F4 OR LOWER |
| | SOFT AND WARM | AV: F4 OR LOWER |
| | FRESH AND LIVELY | AV: F8 OR HIGHER |
| | CALM AND SERENE | AV: F8 OR HIGHER |
| SELECT PHOTOGRAPH FINISH AMBIENCE | DIM AND QUIET | SHIFT AE RESULT BY -1 EV |
| | COOL AND HARD | AV: F11 OR HIGHER |
| | BRIGHT | SHIFT AE RESULT BY +1 EV |
| | DARK | SHIFT AE RESULT BY -1 EV |
| | EXPRESS SENSE OF MOTION | TV: 1/60 sec OR LESS |
| | ROUGHLY | ISO SENSITIVITY: 1,600 OR HIGHER, AV: F5.6 OR HIGHER |
| | MONOCHROME | NOT TO BE CHANGED |
| | SEPIA | NOT TO BE CHANGED |

FIG.10B

| FINISH AMBIENCE (ALTERNATIVES FOR USER SELECTION) | CHANGE WB |
|---|---|
| STANDARD | NOT TO BE CHANGED |
| CLEAR AND SHARP | NOT TO BE CHANGED |
| SOFT AND GENTLE | SLIGHTLY TOWARDS WARM COLORS (TOWARDS HIGH COLOR TEMPERATURE +300 K) |
| SOFT AND WARM | TOWARDS WARM COLORS (TOWARDS HIGH COLOR TEMPERATURE +500 K) |
| FRESH AND LIVELY | SLIGHTLY TOWARDS COLD COLORS (TOWARDS LOW COLOR TEMPERATURE -300 K) |
| CALM AND SERENE | SLIGHTLY TOWARDS COLD COLORS (TOWARDS LOW COLOR TEMPERATURE -300 K) |
| DIM AND QUIET | TOWARDS COLD COLORS (TOWARDS LOW COLOR TEMPERATURE -500 K) |
| COOL AND HARD | TOWARDS COLD COLORS (TOWARDS LOW COLOR TEMPERATURE -500 K) |
| BRIGHT | NOT TO BE CHANGED |
| DARK | NOT TO BE CHANGED |
| EXPRESS SENSE OF MOTION | NOT TO BE CHANGED |
| ROUGHLY | NOT TO BE CHANGED |
| MONOCHROME | NOT TO BE CHANGED |
| SEPIA | NOT TO BE CHANGED |

SELECT PHOTOGRAPH FINISH AMBIENCE

FIG.10C

| FINISH AMBIENCE (ALTERNATIVES FOR USER SELECTION) | | CHANGE IMAGE PROCESSING |
|---|---|---|
| SELECT PHOTOGRAPH FINISH AMBIENCE | STANDARD | NOT TO BE CHANGED |
| | CLEAR AND SHARP | CONTRAST/SHARPNESS: INCREASE, COLOR: INCREASE DENSITY |
| | SOFT AND GENTLE | CONTRAST/SHARPNESS: DECREASE, COLOR: DECREASE DENSITY |
| | SOFT AND WARM | CONTRAST/SHARPNESS: DECREASE, COLOR: INCREASE DENSITY |
| | FRESH AND LIVELY | CONTRAST/SHARPNESS: NO CHANGE, COLOR: NO DENSITY CHANGE |
| | CALM AND SERENE | CONTRAST/SHARPNESS: SLIGHTLY INCREASE, COLOR: INCREASE DENSITY |
| | DIM AND QUIET | CONTRAST: DARK TONE, SHARPNESS: NO CHANGE, COLOR: NO DENSITY CHANGE |
| | COOL AND HARD | CONTRAST/SHARPNESS: INCREASE, COLOR: NO DENSITY CHANGE |
| | BRIGHT | CONTRAST: LIGHT TONE, SHARPNESS: NO CHANGE, COLOR: NO DENSITY CHANGE |
| | DARK | CONTRAST: DARK TONE, SHARPNESS: NO CHANGE, COLOR: NO DENSITY CHANGE |
| | EXPRESS SENSE OF MOTION | NOT TO BE CHANGED |
| | ROUGHLY | CONTRAST/SHARPNESS: INCREASE, COLOR: NO DENSITY CHANGE |
| | MONOCHROME | CONTRAST/SHARPNESS: NO CHANGE, COLOR: DECREASE SATURATION TO 0 |
| | SEPIA | CONTRAST/SHARPNESS: NO CHANGE, COLOR: APPLY REDDISH BROWN TO ENTIRE IMAGE |

FIG.11A

| | MAIN OBJECT (ALTERNATIVES FOR USER SELECTION) | RESTRICTION ON ALTERNATIVES FOR OBJECT LIGHT SOURCE SCENE |
|---|---|---|
| SELECT PHOTOGRAPH FINISH AMBIENCE | STANDARD | NOT RESTRICTED |
| | NATURE LANDSCAPE | FLUORESCENT LAMP, WHITE LED, TUNGSTEN FILAMENT LAMP, MERCURY LAMP, AND FLAME ARE EXCLUDED AND NOT TO BE DISPLAYED |
| | CITY LANDSCAPE | MOONLIGHT AND FLAME ARE EXCLUDED AND NOT TO BE DISPLAYED |
| | SPORTS (LARGE NUMBER OF PARTICIPANTS) | TUNGSTEN FILAMENT LAMP AND FLAME ARE EXCLUDED AND NOT TO BE DISPLAYED |
| | SPORTS (SMALL NUMBER OF PARTICIPANTS) | TUNGSTEN FILAMENT LAMP AND FLAME ARE EXCLUDED AND NOT TO BE DISPLAYED |
| | PORTRAIT (LARGE NUMBER OF PERSONS) | NOT RESTRICTED |
| | PORTRAIT (SMALL NUMBER OF PERSONS) | NOT RESTRICTED |
| | CLOSEUP (OUTDOORS, FLOWERS AND PLANTS) | FLUORESCENT LAMP, WHITE LED, TUNGSTEN FILAMENT LAMP, MERCURY LAMP, AND FLAME ARE EXCLUDED AND NOT TO BE DISPLAYED |
| | CLOSEUP (INDOORS, STILL LIFE) | FLUORESCENT LAMP, WHITE LED, TUNGSTEN FILAMENT LAMP, AND MERCURY LAMP ARE DISPLAYED |
| | VEHICLES | FLAME IS EXCLUDED AND NOT TO BE DISPLAYED |
| | ANIMAL | FLAME IS EXCLUDED AND NOT TO BE DISPLAYED |

FIG.11B

|  | MAIN OBJECT (ALTERNATIVES FOR USER SELECTION) | RESTRICTION ON ALTERNATIVES FOR SELECTING PHOTOGRAPH FINISH AMBIENCE |
|---|---|---|
| SELECT PHOTOGRAPH FINISH AMBIENCE | STANDARD | NOT RESTRICTED |
| | NATURE LANDSCAPE | NOT RESTRICTED |
| | CITY LANDSCAPE | NOT RESTRICTED |
| | SPORTS (LARGE NUMBER OF PARTICIPANTS) | "SOFT AND GENTLE" IS EXCLUDED AND NOT TO BE DISPLAYED |
| | SPORTS (SMALL NUMBER OF PARTICIPANTS) | "SOFT AND GENTLE" IS EXCLUDED AND NOT TO BE DISPLAYED |
| | PORTRAIT (LARGE NUMBER OF PERSONS) | NOT RESTRICTED |
| | PORTRAIT (SMALL NUMBER OF PERSONS) | NOT RESTRICTED |
| | CLOSEUP (OUTDOORS, FLOWERS AND PLANTS) | NOT RESTRICTED |
| | CLOSEUP (INDOORS, STILL LIFE) | "EXPRESS SENSE OF MOTION" IS EXCLUDED AND NOT TO BE DISPLAYED |
| | VEHICLES | NOT RESTRICTED |
| | ANIMAL | NOT RESTRICTED |

IMAGING APPARATUS AND IMAGING APPARATUS CONTROL METHOD FOR AUTOMATICALLY SETTING A FINISHING STATE OF A PHOTOGRAPH

BACKGROUND OF THE INVENTION

1. Field of the Invention

The present invention relates to an imaging apparatus and an imaging apparatus control method configured to automatically set a finishing state of a photograph requested by a user of the imaging apparatus.

2. Description of the Related Art

As functions for automatically controlling a finishing state of a photograph requested by a user, a conventional digital camera includes a scene mode, which is a mode for controlling an exposure by an imaging optical system, and a finishing setting for controlling image processing parameters used during development.

In recent years, most digital cameras include the function of the scene mode for controlling the exposure. For example, if a "landscape mode" is selected, an exposure control for increasing a depth of field is executed by greatly increasing an aperture value of an imaging lens to appropriately photograph an image of a landscape. If a "portrait mode" is selected, the exposure control for setting a low depth of field by setting a low aperture value of the imaging lens to appropriately shoot an image of a person.

On the other hand, Japanese Patent Application Laid-Open No. 2008-011413 discusses the following method for executing a finishing setting for controlling an image processing parameter, which is used in developing a photographed image. More specifically, in the method discussed in Japanese Patent Application Laid-Open No. 2008-011413, a plurality of types of photograph finishing setting (preset parameters) is provided to a digital camera. Further, the parameters for controlling contrast (gamma correction setting) processing and color processing, which are executed during development, are changed according to a finishing setting set by the user. With this configuration, the conventional method executes processing for achieving the finishing of the photograph desired by the user. In addition, Japanese Patent Application Laid-Open No. 2008-011413 discusses a method for allowing the user to further set the above-described image processing parameters in detail (user-set parameters).

However, in the above-described conventional method, even if the user is very conversant with how to express a photographed image, it may be difficult for the user to set the photograph expression method by setting the image processing parameters unless the user is conversant with digital image processing in addition to the technique for shooting a photograph.

SUMMARY OF THE INVENTION

The present invention is directed to an imaging apparatus capable of allowing a user to execute a photographing setting for extending a range of expression and easily achieving an image quality desired by the user and capable of realizing the expression of the finished photograph as desired even if the user is not very conversant with digital image processing.

According to an aspect of the present invention, an imaging apparatus includes an imaging unit configured to photograph an image of an object, a first selection unit configured to select an object to be photographed from among predetermined alternatives, a second selection unit configured to select an environment in which the object illuminated by a light source with light from among predetermined alternatives, a third selection unit configured to select a feeling of a finished image from among predetermined alternatives, a first setting unit configured to set a photographing condition according to results of the selection by the first, the second, and the third selection units, a control unit configured to control the imaging unit according to the photographing condition set by the first setting unit, a second setting unit configured to set an image processing parameter used in image processing to be executed on image data photographed by the imaging unit according to the results of the selection by the first, the second, and the third selection units, and an image processing unit configured to execute image processing on the image data photographed by the imaging unit using the image processing parameter set by the second setting unit.

According to an exemplary embodiment of the present invention, the user of an imaging apparatus is allowed to execute a photographing setting for extending a range of an expression and easily achieving an image quality desired by the user, and can realize the expression of the finished photograph as desired even if the user is not conversant with digital image processing.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIGS. 1A and 1B illustrate an exemplary configuration of a digital camera according to a first exemplary embodiment of the present invention.

FIG. 6 illustrates an example of a sharpness characteristic that can be set by the image processing parameter setting unit.

FIGS. 9A and 9B illustrate an example of a shooting object selection item and an object light source state selection item and an example of setting of each item according to the first exemplary embodiment.

FIGS. 10A through 10C illustrate an example of a photograph finish ambience selection item and an effect to a setting for the selection item from other settings.

FIGS. 11A and 11B illustrate exemplary setting items used in a selection according to the second exemplary embodiment and a content of a mutual effect between the settings.

DESCRIPTION OF THE EMBODIMENTS

Various exemplary embodiments, features, and aspects of the invention will be described in detail below with reference to the drawings.

A first exemplary embodiment of the present invention implements a photograph finishing desired by a user by allowing the user to select a scene to be photographed, an object state, and a finishing and interlocking with a shooting condition and an image processing parameter.

Figure 1B:
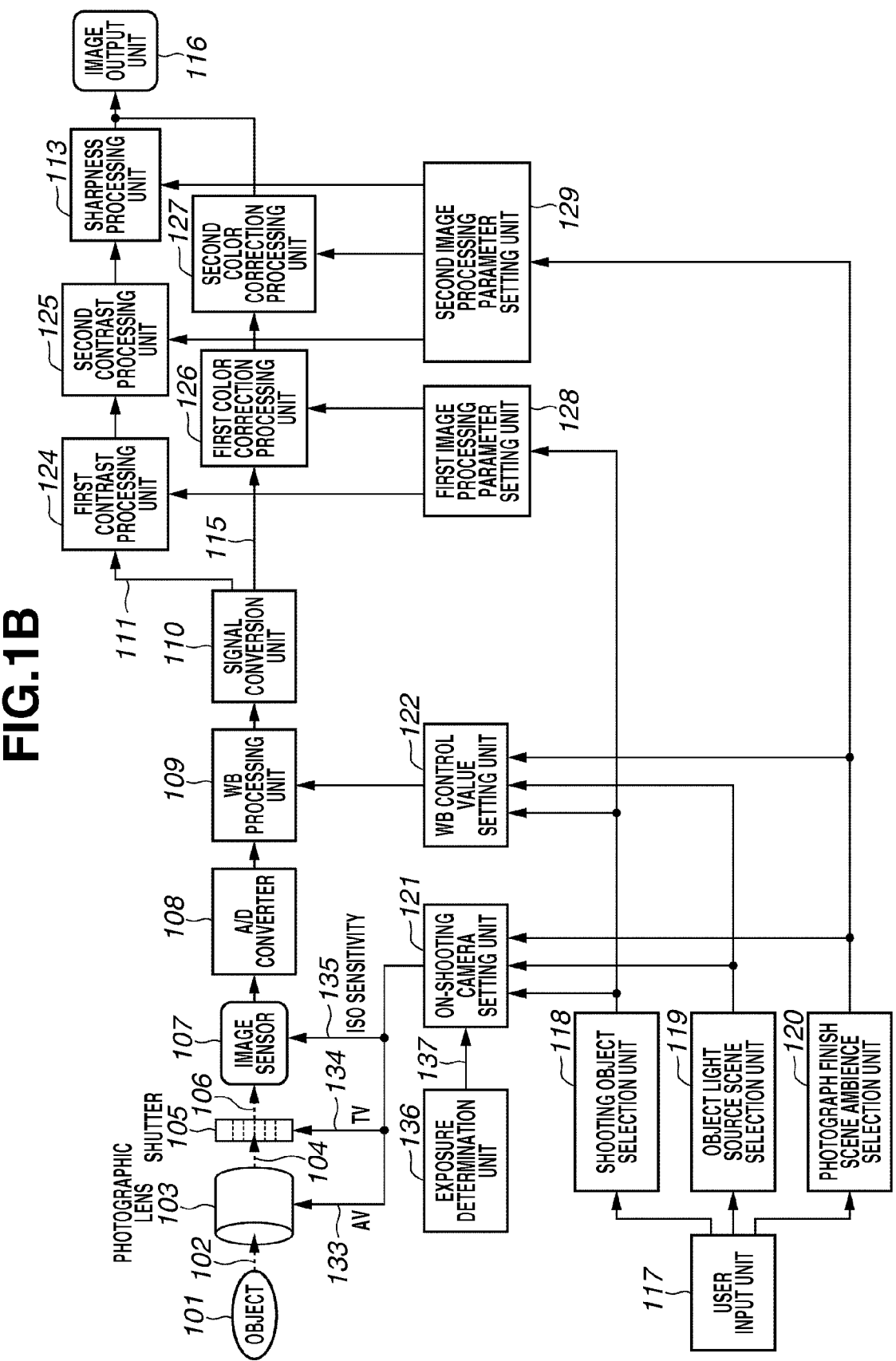
Figure 2:
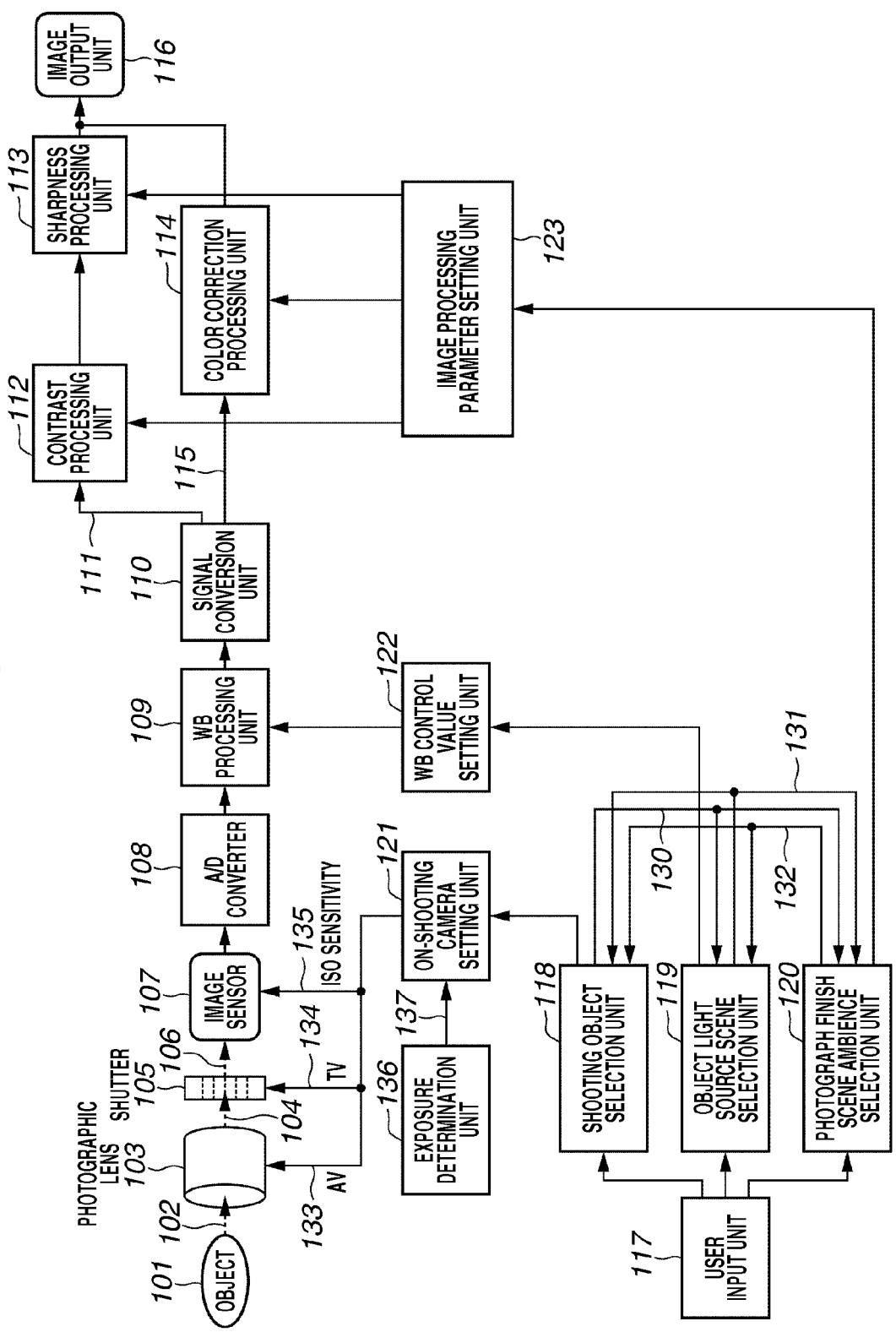
FIG. 2 illustrates an exemplary configuration of a digital camera according to a second exemplary embodiment.

FIGS. 1A and 1B are block diagrams of a digital camera which is an example of an imaging apparatus according to the present exemplary embodiment. Referring to FIGS. 1A and 1B, shooting is executed by forming images 102, 104, and 106 of an object 101 into an object image on an image sensor 107 via an imaging lens 103 and a shutter 105.

An imaging control is executed to generate an image signal of an optimum brightness on the image sensor 107 by adjusting an aperture value AV of the imaging lens 103, a shutter speed (time value) TV, and an International Organization for Standardization (ISO) sensitivity of the image sensor 107 according to the brightness of the object.

In the following description, it is supposed that the image sensor 107 is constituted by three types of pixels having the sensitivity to wave ranges of red (R), green (G), and blue (B) (RGB) light.

The combination of the aperture value AV, the shutter speed TV, and the ISO sensitivity is widely used in auto exposure (AE) shooting that uses an exposure value determined according to an output of a sensor for light-metering the brightness of an object.

An image signal from the image sensor 107 is converted by an analog-to-digital (A/D) converter 108 into RGB digital signals. Each of the digitized RGB image signals is amplified by a white balance (WB) processing unit 109 with a gain and is adjusted for the white balance. The RGB image data whose white balance has been adjusted is converted by a signal conversion unit 110 into a brightness signal Y 111 and a color signal uv 115.

The brightness signal Y is subjected to development processing by a contrast processing unit 112 and a sharpness processing unit 113. The color signal uv is processed by a color processing unit 114 to adjust the saturation and the hue. In the above-described manner, image data of an image quality high enough for the user to view. The generated image data is output by an image output unit 116. The output image data is subjected to image processing, such as compression, and is then recorded on a recording medium (not illustrated).

A white point is set by the white balance processing unit 109 according to various levels of the color temperature of the light source that illuminates the object with light. Further, the white balance processing unit 109 changes parameters used by the units 112 through 114, which execute a series of subsequent image processing. Accordingly, the appearance of an image, in other words, the image quality as to the sharpness or the density of the image, can be adjusted.

A method, which is a characteristic feature of the present invention, for determining the final image quality of an image output by the image output unit 116, i.e., a method for determining an ambience (or feeling) of finishing of a photographed image, will be described in detail below with reference to a flow chart of FIG. 3.

Figure 3:
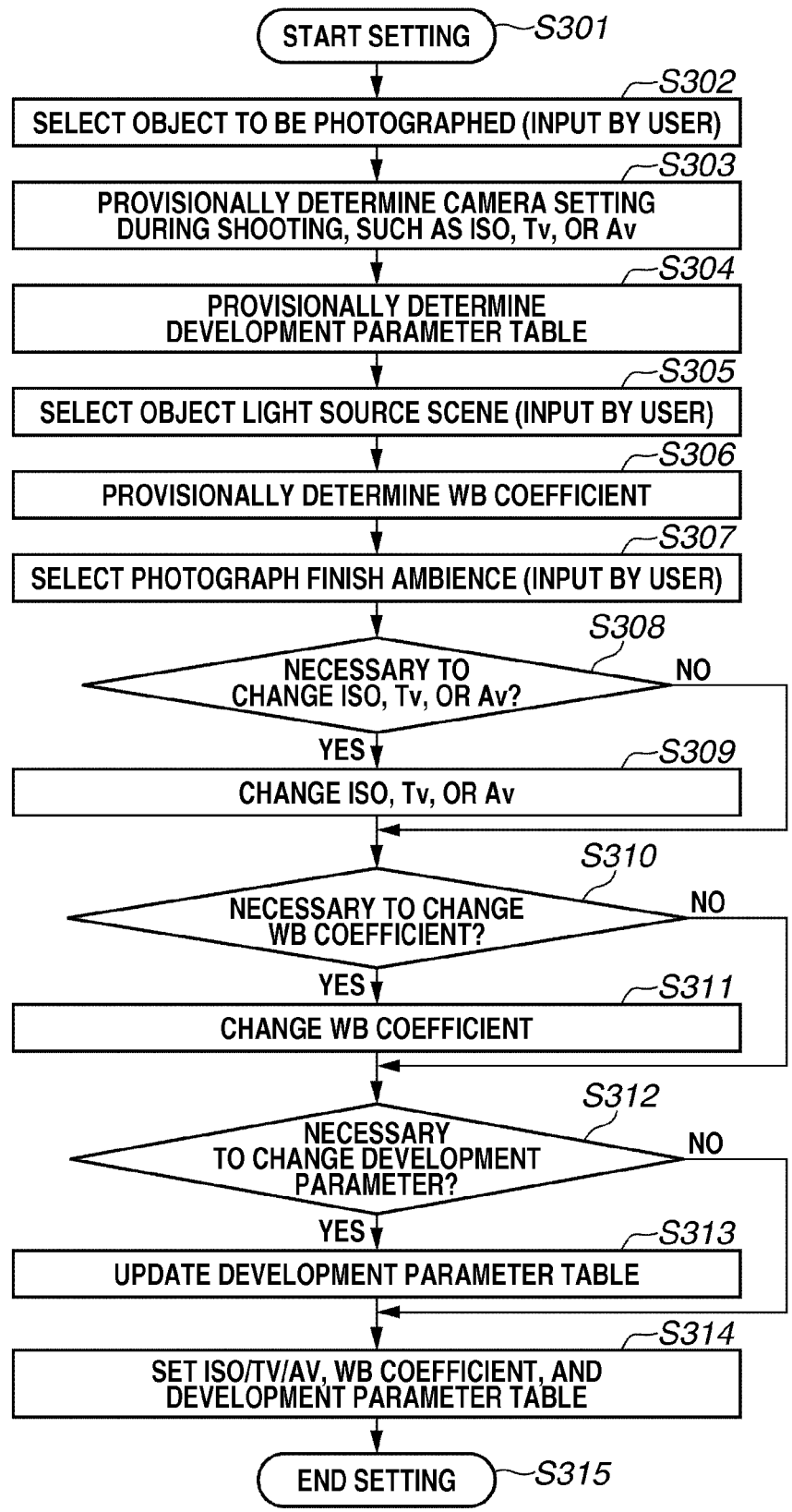
FIG. 3 is a flow chart illustrating an exemplary flow of shooting parameter setting processing according to the first exemplary embodiment.

Referring to FIG. 3, in step S301, the user sets "what is the object" via a shooting object selection unit 118. Further, the user sets "what types of a scene of the light source that the object is in" via an object light source state selection unit 119. Furthermore, the user sets "what types of the ambience (or feeling) is used for the finishing of the photograph" via a photograph finish ambience selection unit 120.

Alternatives for the selection in step S301, which are illustrated in FIGS. 9A, 9B, 10A, and 10B, are provided. The user selects and inputs an item corresponding to a desired setting from among the alternatives via a user interface and the user input unit 117.

The items selected via the shooting object selection unit 118 indicate the types of the objects illustrated in FIG. 9A. In step S302, the items are displayed on the user interface to allow the user to select an optimum item.

In step S303, an on-shooting camera setting unit 121 outputs a signal for determining the aperture value AV, a signal 134 for determining the shutter speed TV, and a signal for determining the ISO sensitivity according to an exposure value 137, which is output from an object exposure determination unit 136.

More specifically, if the second item "nature landscape" illustrated in FIG. 9A is selected, an exposure table for setting a higher aperture value AV compared with a case of taking an object different from a nature landscape is used to execute panned focusing shooting at a relatively deep field depth.

On the other hand, if the fifth item "sports (small number of participants)" is selected, because a scene of a martial art fought by two contenders or a scene of swimming in which one swimmer is swimming may be photographed, the ISO sensitivity and the shutter speed TV are set higher compared to a case of shooting a different object to enable shooting of a quickly moving object.

In other modes, an exposure table that can implement a combination of the aperture value AV, the shutter speed TV, and the ISO sensitivity appropriate for an object to be photographed in each case is provided to set the aperture value AV, the shutter speed TV, and the ISO sensitivity according to an exposure value 137.

In step S304, an image processing parameter setting unit 123 sets an image processing parameter appropriately for the shooting object selected via the shooting object selection unit 118.

The contrast processing unit 112, the sharpness processing unit 113, and the color correction processing unit 114 executes processing having characteristics illustrated in FIGS. 5A through 5D, FIG. 6, and FIG. 7A, respectively, by using the set image processing parameter.

Figure 5A:
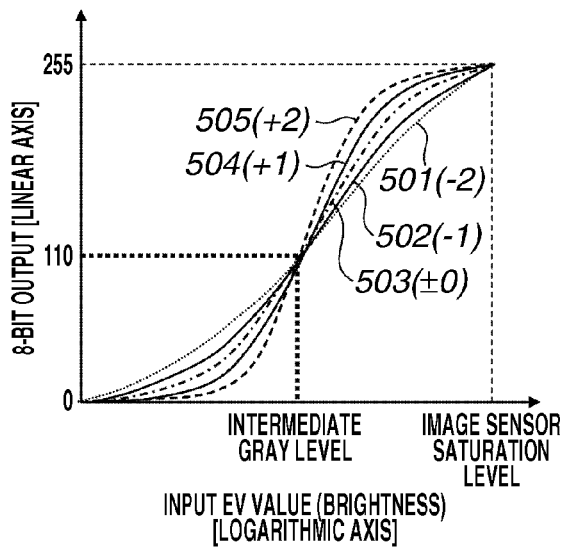
FIGS. 5A through 5D illustrate an example of a contrast characteristic that can be set by an image processing parameter setting unit.
Figure 5B:
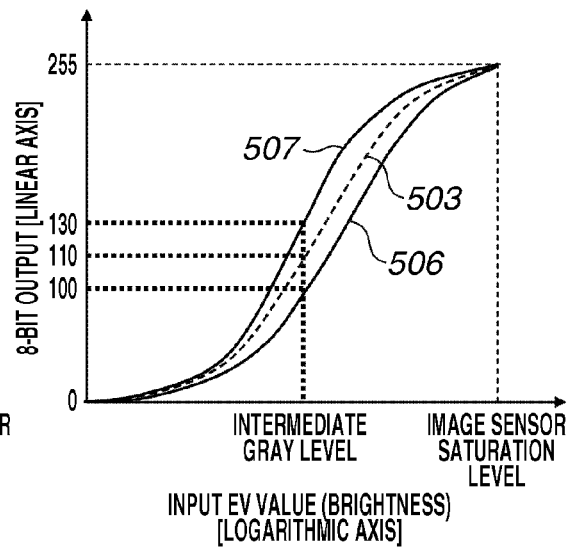
Figure 5C:
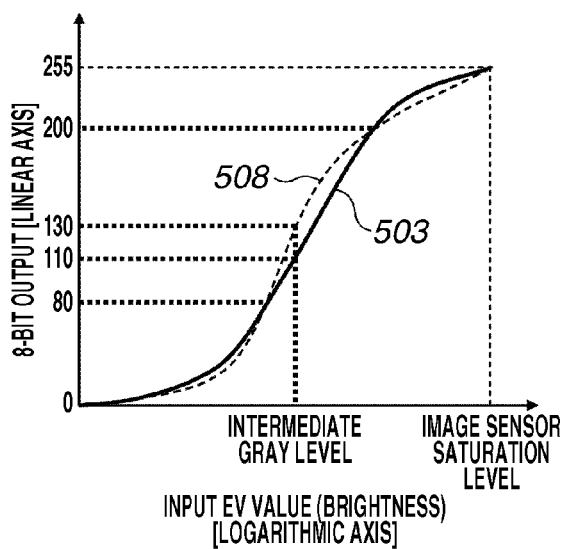
Figure 5D:
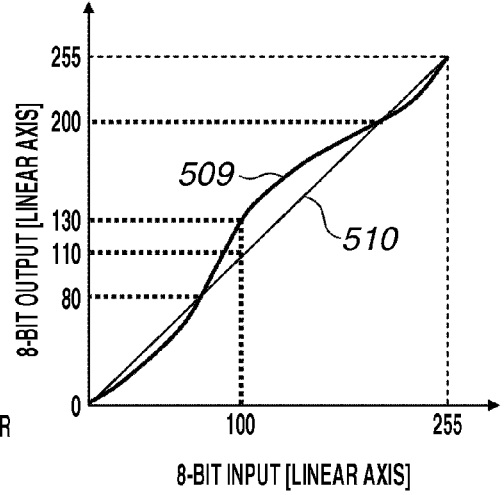

FIGS. 5A through 5C illustrate a gamma characteristic, in which an exposure value (EV) to be input is taken on the horizontal axis (logarithmic axis) and an 8-bit output is taken on the vertical axis. The gamma curves illustrated in FIGS. 5A through 5C are used in processing the brightness signal Y 111 of the image data by the contrast processing unit 112.

Figure 7A:
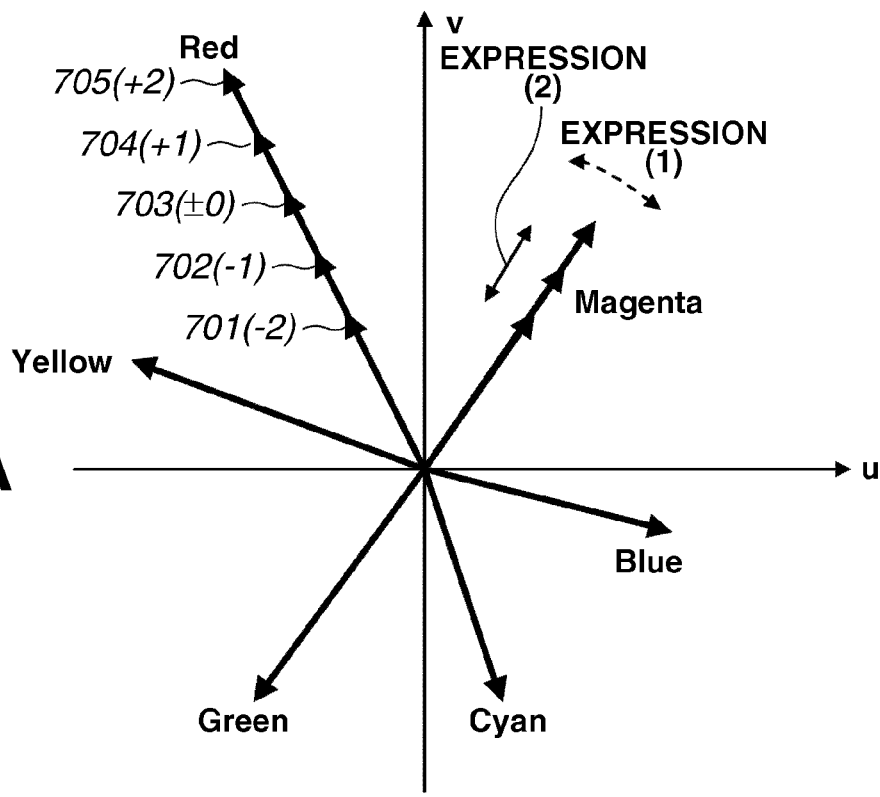
FIGS. 7A and 7B illustrate an example of a hue characteristic and a saturation characteristic that can be set by the image processing parameter setting unit.
Figure 7B:
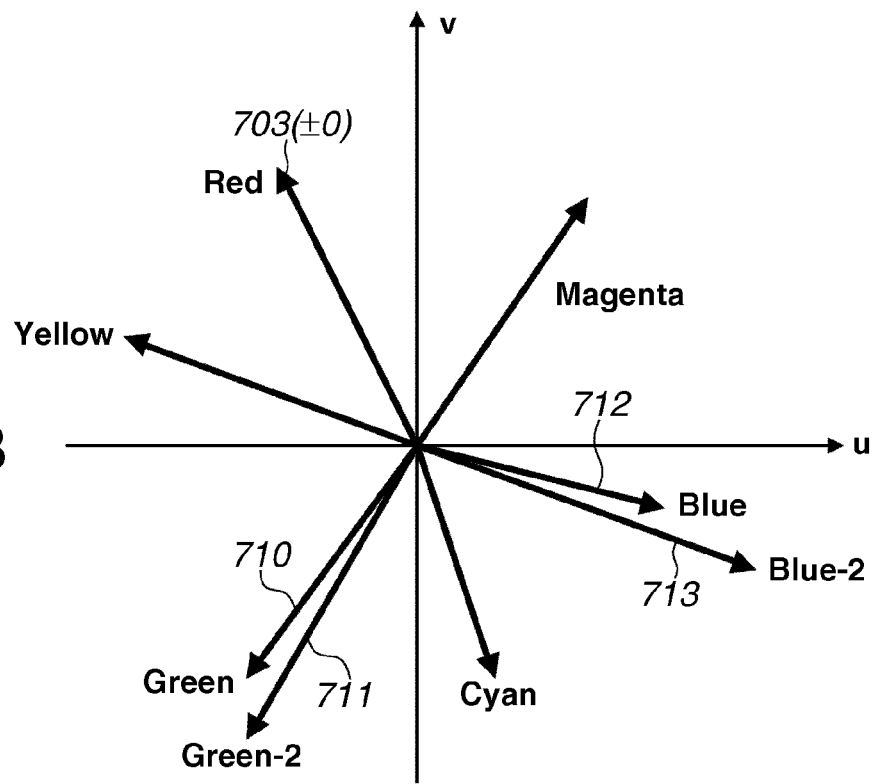

FIG. 6 illustrates an outline enhancement characteristic, in which a coordinate of a boundary of an image is taken on the horizontal axis and an image level is taken on the vertical axis. The sharpness processing unit 113 applies the outline enhancement characteristic by using a signal from the contrast processing unit 112 as an input. FIGS. 7A and 7B illustrate color conversion on a uv plane, which is executed by the color processing unit 114.

As illustrated in FIG. 5A, the contrast processing unit 112 applies characteristics of 8-bit outputs, which range from 0 to 255 and are provided with the gamma characteristic, to an input of the brightness signal Y 111 (a logarithm expression axis) to achieve characteristics 501 through 505. More specifically, the characteristic 503 has a standard contrast characteristic. The characteristic 502 is provided, which has a contrast lower than that of the characteristic 503. The characteristic 501 is provided, which has a contrast further lower than that of the characteristic 502. On the other hand, the characteristic 504 is provided, which has a contrast higher than that of the characteristic 503. Further, the characteristic 505 is provided, which has a contrast higher than that of the characteristic 504. To each of the characteristics 501 through 505, an intermediate gray level of 110 for exposure is set.

The sharpness processing unit 113 prepares characteristics 601 through 605 to provide an outline enhancement characteristic 611 to the boundary portion of a monochromatic image 610 using a signal that has been subjected to contrast processing as illustrated in FIG. 6 as an input. The characteristic 603 is a standard outline enhancement characteristic. The characteristic 602 is an outline enhancement characteristic less intense than the characteristic 603. The characteristic 601 is an outline enhancement characteristic further less intense than the characteristic 602. In addition, the characteristic 604 is an outline enhancement characteristic more intense than the characteristic 603. Further, the characteristic 604 is an outline enhancement characteristic more intense than the characteristic 604.

The color processing unit 114 executes correction processing on a color signal generated by converting an RGB signal into a uv signal using the following two expressions (1) and (2):

EXPRESSION (1)

$$\begin{pmatrix} u' \\ v' \end{pmatrix} = \begin{pmatrix} a & b \\ c & d \end{pmatrix} \begin{pmatrix} u \\ v \end{pmatrix}$$ expression (1)

EXPRESSION (2)

$$\begin{pmatrix} u' \\ v' \end{pmatrix} = \begin{pmatrix} m & 0 \\ 0 & n \end{pmatrix} \begin{pmatrix} u \\ v \end{pmatrix}.$$ expression (2)

As illustrated in a portion of a color of magenta in FIG. 7A, the hue is converted by a mapping in a substantially concentrically rotational direction on the uv coordinate by changing parameters a, b, c, and d in the expression (1). The saturation is adjusted by applying the gain primarily radially on the uv coordinate by changing parameters m and n in the expression (2). The same applies to the colors different from magenta.

In the present exemplary embodiment, the expression (2) for changing the direction of saturation, i.e., the color density, will be primarily described. As illustrated in a portion of a color of red in FIG. 7A, five types of characteristics 701 through 705 are provided by changing the color density by changing the parameters m and n in the expression (2). The parameters m and n are applied to all colors. Accordingly, the colors other than red have the five types of saturation color characteristics.

If the coordinates (m, n), at which the saturation of the color characteristic 703 can be achieved, are coordinates for a standard color reproduction, the color characteristic 702 is achieved by a combination of the coordinates (m, n), at which the saturation is lower than the saturation of the characteristic 703. The color characteristic 701 has a saturation further lower than the saturation of the color characteristic 702. On the other hand, the color characteristic 704 is achieved by a combination of the coordinates (m, n), at which the saturation is higher than the saturation of the characteristic 703. Further, the color characteristic 705 is achieved by a combination of the coordinates (m, n), at which the saturation is higher than the saturation of the characteristic 704.

Figure 8A:
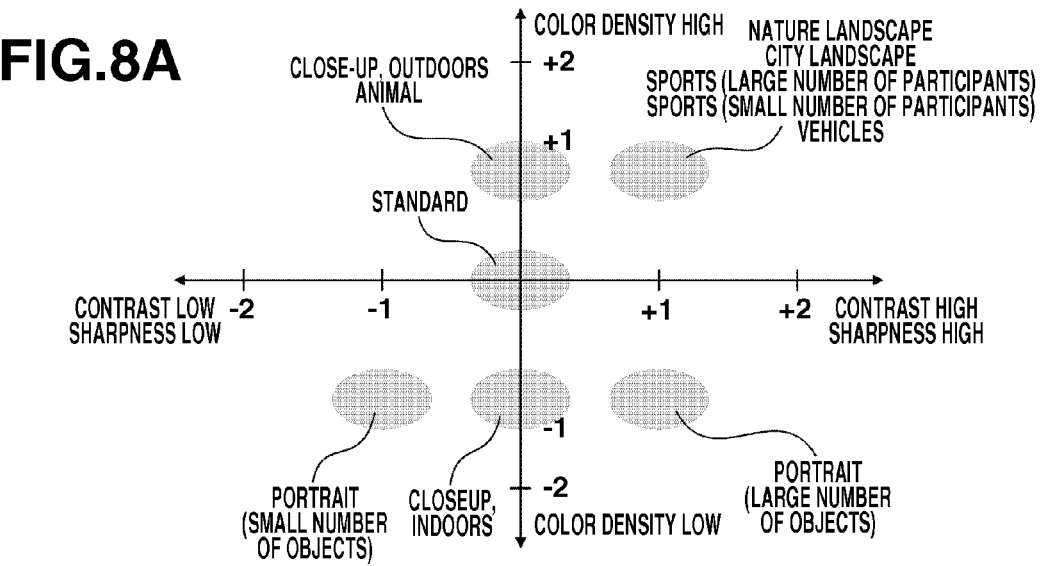
FIGS. 8A through 8C illustrate an exemplary association between each setting item and an image processing parameter, which are set and mutually associated by a shooting object selection unit.

The image processing parameter setting unit 123 determines each image processing parameter to achieve a mapping illustrated in FIG. 8A according to a result of the selection of the shooting object which is executed via the shooting object selection unit 118.

Figure 8B:
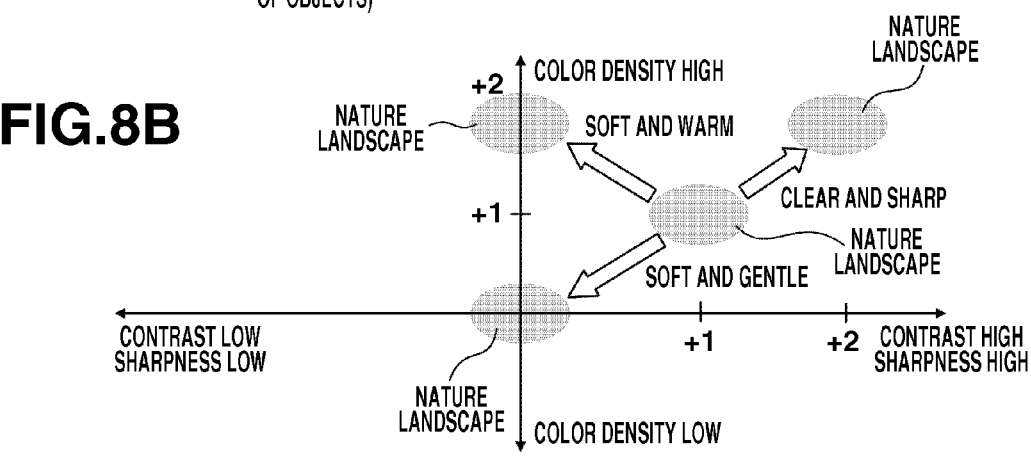
Figure 8C:
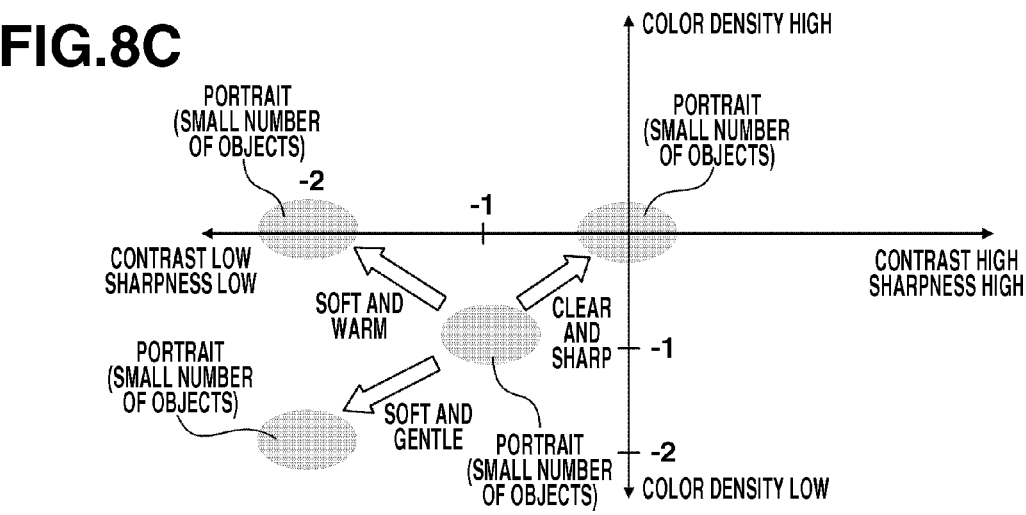

FIGS. 8A through 8C schematically illustrates how the content of image processing to be executed changes according to each object selection item. In FIGS. 8A through 8C, the level of the contrast processing and the sharpness processing is taken on the horizontal axis while the density level of the color is taken on the vertical axis. The determined parameter is set to the contrast processing unit 112, the sharpness processing unit 113, and the color correction processing unit 114.

For example, the processing executed if a "city landscape" is set will be described in detail below. In the mapping illustrated in FIG. 8A, a hard finishing with a contrast and a sharpness higher than those in the standard setting is set and the finishing with the color density slightly higher than that in the standard setting is intended to express the landscape of a city.

In order to achieve such settings, the contrast processing unit 112 executes the setting of a curve 505 illustrated in FIG. 5A, and the sharpness processing unit 113 executes the setting of a curve 605 illustrated in FIG. 6. More specifically, with the above-described settings, the contrast and the sharpness are set higher than the standard setting by two levels. For the color saturation, the gain of the color processing unit 114 is set at a level 705 illustrated in FIG. 7A. In this manner, the color saturation is set higher than the standard setting by one level.

The above-described setting and operations are applied and executed if any other mode is selected. Accordingly, using the mapping illustrated in FIG. 8A, the image processing parameter setting unit 123 sets each image processing parameter for the contrast processing unit 112, the sharpness processing unit 113, and the color processing unit 114.

Items selected by the object light source state selection unit 119 indicate the type of light source that illuminates an object as illustrated in FIG. 9B. The items selected by the object light source state selection unit 119 are displayed on a user interface. In step S305, the user is allowed to select an optimum light source.

In the example illustrated in FIG. 9B, the user selects an optimum light source by selecting the white balance intended to "faithfully reproduce white dots" or the white balance intended to "use the effect of an impressive color".

For example, if "twilight" has been selected as the light source, an object illuminated with the twilight of morning or evening may look reddish to a person. In this case, if the user desires to express the whiteness of a white object in expressing the photograph, the user selects to "faithfully reproduce white dots". Further, a white balance control value setting unit 122 determines a white balance coefficient corresponding to 2,500 K. Then the white balance processing unit 109 executes the white balance processing according to the above-described user selection and the determined white balance coefficient.

On the other hand, if the "twilight" has been selected and the user desires to express the photograph by a reddish expression of a white object as it looks to a person, the user sets to "use the effect of the impressive color". Further, the white balance control value setting unit 122 determines a white balance coefficient corresponding to 5,000 K. In step S306, the white balance processing unit 109 executes the white balance processing according to the above-described user selection and the determined white balance coefficient.

The "effect of the impressive color" refers to the white balance control for implementing the color reproduction that can implement a color reproduction as close to the vision of a person as possible. In addition to the above-described control executed when the object is subjected to twilight, if a "tungsten filament lamp" has been selected, the following white balance control is executed in order to leave the reddishness as close to the level of red recognized by the vision of a person as possible. More specifically, the white balance control corresponding to 5,000 K, at which the level of correction of the reddishness is lower than that in the correction at 3,000 K corresponding to the color temperature of a filament lamp, is executed. On the other hand, if a "shadow on a fine day" has been selected, the following white balance control is executed to leave the blueness as close to the level of blue recognized by the vision of a person as possible. More specifically, in this case, the white balance control corresponding to 5,500 K, at which the level of correction of the blueness is lower than that in the correction at 7,000 K corresponding to the color temperature of a shadow on a fine day.

Items selected by the photograph finish ambience selection unit 120 include items of "finish ambience (alternatives for user selection)" which are illustrated in FIGS. 10A through 10C. In step S307, the user selects and inputs a desired finish ambience of the photograph by selecting from the items displayed on the user interface.

In step S308, the on-shooting camera setting unit 121 determine whether the aperture value AV, the shutter speed TV, and the ISO sensitivity, which have already been set, are appropriate for the finishing of the photograph selected and input by the user, according to a result of the selection output by the photograph finishing ambience selection unit 120.

For the determination condition in step S308, if the shooting condition previously set in step S303 does not satisfy the condition corresponding to the selected item in the right column field in FIG. 10A (YES in step S308), then in step S309, the setting is changed to satisfy the condition while maintaining the AE result.

For example, if the "clear and sharp" has been selected by the user and if the setting "AV: F5.6, TV: 1/125 sec, ISO sensitivity: 200" has already been executed in step S303, the setting is changed to the setting "AV: F8, TV: 1/60 sec, ISO sensitivity: 200". The condition for the change "AV: F8 or higher" illustrated in the table (FIG. 10A) is intended to execute a setting at a deep depth of field with the F-number of F8 or higher to more effectively implement the effect of the "clear and sharp".

On the other hand, if the "dim and quiet" has been selected, the program for combining the aperture value AV, the shutter speed TV, and the ISO sensitivity to be shifted to achieve an exposure value for shooting at a low exposure value lower than the exposure value set in step S303 by 1 EV. The above-described change is intended to shoot an image at a setting at which the brightness of the image becomes dark to appropriately execute the effect of the "dim and quiet".

Further, if the "roughly" has been selected and if the setting "AV: F2.8, TV: 1/125 sec, and the ISO sensitivity: 200" has already been set in step S303, then the setting is changed to the setting "AV: F5.6, TV: 1/250 sec, and the ISO sensitivity: 1,600". The condition for the change "ISO sensitivity: 1,600 or higher" in the table is intended to increase the ISO sensitivity to a level at which random noises can become highly visible on the finished photograph to appropriately execute the effect of the "roughly".

If the "bright" has been selected, the exposure program is shifted to a setting for shooting an image with an exposure value higher than the exposure value determined in step S303 by 1 EV. With the above-described setting, the photographed image can be finished bright. In addition, by providing a tone curve characteristic 507 illustrated in FIG. 5B to the contrast processing unit 112 used during image processing, the ambience of a finished photograph can be controlled to become bright.

The similar effect can be achieved if the "dark" has been selected for the photograph finish ambience. More specifically, the result of the shooting (the photographed image) can become dark by shifting the exposure program to a setting at which the exposure value is lower than the exposure value determined in step S303 by 1 EV. In addition, by providing the tone curve characteristic 506 illustrated in FIG. 5B to the contrast processing unit 112 used during image processing, the ambience of a finished photograph can be controlled to become dark.

As described above, if the "bright" or the "dark" has been selected, the processing can be executed by changing both the exposure value and the contrast or by changing either one of the exposure value and the contrast.

If a photograph finish ambience other than those described above has been selected, the aperture value AV, the shutter speed TV, and the ISO sensitivity are changed according to the content of the change instructed as illustrated in FIG. 10A in the similar manner.

In step S310, it is determined whether to change the coefficient for the white balance processing according to the photograph finish ambience selected by the user.

In step S311, for the determination condition in step S310, using the white balance coefficient previously set in step S306, the corresponding color temperature is shifted by the white balance processing according to an instruction for changing the setting, which is in the right column field illustrated in FIG. 10B corresponding to the item selected by the user.

For example, if the "soft and warm" has been selected and if "5,000 K" has already been set in step S306, the following change is executed. More specifically, the white balance processing is shifted to be processed with the white balance coefficient corresponding to "5,500 K", and is changed to be set by the white balance control value setting unit 122. The above-described change is intended and executed to cause the entire image to look highly reddish and warm by shifting the corresponding color temperature to a high temperature to effectively express the ambience "soft and warm".

On the other hand, if the "dim and quiet" has been selected and if "6,500 K" has already been set in step S306, the following change is executed. More specifically, the white balance processing is shifted to be processed with the white balance coefficient corresponding to "6,000K", and is changed to be set by the white balance control value setting unit 122. The above-described change is intended and executed to cause the entire image to look blue to express the ambience of a shadow by shifting the corresponding color temperature to a low temperature to effectively express the ambience "dim and quiet".

If any other photograph finish ambience has been selected, the white balance coefficient is changed according to the content of the change instructed as described above with reference to FIG. 10B in the similar manner.

In step S312, it is determined whether to change image processing parameters for the contrast, the sharpness, and the color processing according to the photograph finish ambience selected by the user.

In step S313, for the determination condition in step S312, each image processing parameter is changed according to an instruction for the change, which is illustrated in FIG. 10C in the right column field corresponding to the item selected by the user, with respect to the image processing parameters previously set in step S304.

Suppose that the "nature landscape" has been selected as the shooting object. The "nature landscape" is mapped in step S304 at a position of the image finish indicated by "nature landscape" illustrated in FIG. 8A. In this case, if "clear and sharp" has been set as the photograph finish ambience, each of three parameters is to be changed according to the changing instruction illustrated in FIG. 10C, i.e., "contrast/sharpness: increase, color: increase density".

More specifically, the originally set contrast 504 in FIG. 5A, sharpness 604 in FIG. 6, and the color 704 in FIG. 7A are shifted to the contrast 505 in FIG. 5A, the sharpness 605 in FIG. 6, and the color 705 in FIG. 7A, respectively. As a result, the finishing of the photograph of the "nature landscape", to which the effect of the "clear and sharp" has been applied, shifts its image finish position in the upper-right direction as illustrated in FIG. 8B.

Similarly, if the "soft and warm" has been selected for the shooting object "nature landscape", the photograph is finished by sifting the image finish position in the upper-left direction as illustrated in FIG. 10C, by applying the instructed change "contrast/sharpness: decrease, color: increase density" illustrated in FIG. 10C.

If the "soft and gentle" has been selected, the photograph is finished by shifting the image finish position in the lower-left direction as illustrated in FIG. 8B, by applying the instructed change "contrast/sharpness: decrease, color: decrease density" illustrated in FIG. 10C.

If the shooting object "portrait (small number of persons)" has been selected, the image finish position is shifted to the position illustrated in FIG. 8C. If any other shooting object has been selected or if any other photograph finish ambience has been selected, the similar operation is executed.

As described above, the final shooting conditions, i.e., the aperture value AV, the shutter speed TV, the ISO sensitivity, the white balance coefficient, and the image processing parameters, are determined. Further, the aperture value AV, the shutter speed TV, and the ISO sensitivity are set by the on-shooting camera setting unit 121 to the imaging lens 103, the shutter 105, and the image sensor 107.

The white balance coefficient is set by the white balance control value setting unit 122 to the white balance processing unit 109. In step S314, the image processing parameter is set by the image processing parameter setting unit 123 to each of the contrast processing unit 112, the sharpness processing unit 113, and the color correction processing unit 114. The photographed image data is developed using the above-described parameters and is then output by the image output unit 116.

In the above-described first exemplary embodiment, particularly in the description made with reference to FIG. 8, the image processing parameters to be shifted by the shooting object selection unit 118 and the photograph finishing ambience selection unit 120 are set to achieve a substantially even effect of the change. For example, for the contrast characteristic illustrated in FIG. 5A, the intermediate gray level is defined at 110 at the 8-bit output. Further, the brightness intensity difference is controlled to be even around the intermediate gray level of 110. In addition, the intensity of the contrast is set at five levels ranging from −2 to +2. Moreover, for the color density, the gain in the direction of the saturation is evenly assigned at five levels ranging from −2 to +2 around the value ±0 of the level 703 of red in FIG. 7A. In this manner, the effect of controlling the color density is assigned and achieved.

When the configuration of the image processing illustrated in FIG. 1B is applied to the method of shifting the image processing parameters and by setting the image processing parameters as follows, the present exemplary embodiment can implement a method for generating and processing an image capable of applying the user's desire. In the following description, for example, the image processing parameters used if a "nature landscape" has been set as the shooting object will be described in detail below in mutual comparison.

To begin with, contrast processing according to the method to be described below has the following difference point from the contrast processing according to the above-described first exemplary embodiment. In the setting 503 in FIG. 5C, which is a transferred value corresponding to the standard setting 503 illustrated in FIG. 5A, the setting 504 (FIG. 5A) is provided to the nature landscape in the above-described first exemplary embodiment. The setting 504 indicates a higher contrast characteristic for setting an output on the high luminance side to a higher level and for setting an output on the low luminance side to a lower level across the intermediate gray level set by the 8-bit output of 110.

On the other hand, a characteristic 508 illustrated in FIG. 5C is prepared for the "nature landscape" as a characteristic for increasing the quality of the nature landscape image. For the characteristic 508, the output is executed at a lower level in the level whose brightness is lower than the intermediate gray level (i.e., 80 least significant bit (LSB) or lower). Further, the output is executed at a level higher than the standard setting 503 around the intermediate gray level. In this manner, the contrast is intensified in the range from the low luminance of 80 LSB to the intermediate luminance of 200 LSB. Furthermore, the setting is executed to perform the output at a level lower than the standard setting but at 200 LSB or higher to leave a high luminance gradation.

As described above, the parameters for the contrast that more effectively characterize the "nature landscape" are provided, and the characteristic is set as the center setting for the contrast of the "nature landscape". If the contrast setting for the "standard setting" is set at the gain of 1 time to achieve a characteristic 510 illustrated in FIG. 5D, then for the parameter, a difference from the contrast setting for the standard setting, which is the characteristic of a "nature landscape" image, can be defined as a characteristic 509. The contrast characteristic difference between the "standard setting" and the "nature landscape" is set as the center setting for the contrast of the "nature landscape". A first contrast processing unit 124 in FIG. 1B executes the setting with the center setting set in the above-described manner.

An example of contrast setting for applying the result of the selection via the photograph finishing ambience selection unit 120 executed using the above-described contrast center setting for the "nature landscape" will be described in detail below.

For example, if the "clear and sharp" has been set as the photograph finish ambience, the image processing parameters for applying the "clear and sharp" effect are applied to the "standard setting" contrast characteristic 503 in FIG. 5A to provide a contrast characteristic 504 for more clearly reproducing the image, similar to the first exemplary embodiment. The "clear" setting clearer than the standard setting is executed in a second contrast processing, which is executed by a second contrast processing unit 125 in FIG. 1B.

By executing the above-described processing, the first contrast processing unit 124 provides the characteristic of the "nature landscape" and the second contrast processing unit 125 provides the "clear" characteristic for more clearly reproducing the image compared to the standard setting. As a result, the image quality having the contrast characteristic desired by the user can be achieved.

Color correction processing can be similarly executed. If the "nature landscape" has been selected as the shooting object, the color characteristic of the "nature landscape" is calculated using the expressions (1) and (2) as illustrated in FIG. 7B, and the direction of the hue of colors around blue is rotated towards the color of cyan in relation to the "standard setting" using the expression (1). Further, the gain is applied in the direction of the saturation using the expression (2) to convert the setting into a setting for intensifying the color of the blue sky (i.e., a characteristic 712 of the color of blue is converted into a characteristic 713).

The direction of the hue of colors around green is rotated towards the color of cyan using the expression (1). In addition, the gain is applied in the direction of the saturation using the expression (2) to convert the setting into a setting for causing the landscape of a forest to look more attractive by increasing the blueness of the color of dark green (i.e., a characteristic 710 of the color of green is converted into a characteristic 711). A first color correction processing unit 126 illustrated in FIG. 1B executes the above-described processing.

If the "clear and sharp" has been selected as the photograph finish ambience, the image processing parameters for applying the "clear and sharp" effect are applied an entire color gamut to express the "sharp" characteristic by applying a gain 704 which corresponds to the characteristic 703 in FIG. 7A. A second color correction processing unit 127 illustrated in FIG. 1B executes the above-described processing.

By executing the above-described processing, the first color correction processing unit 126 applies the characteristic of the "nature landscape" and the second color correction processing unit 127 applies the "sharp" characteristic for more sharply reproducing the image compared to the standard setting. As a result, the image quality having the color characteristic desired by the user can be achieved.

Similarly, in other cases, if the "nature landscape" has been selected as the shooting object and if "soft and gentle" has been selected as the photograph finish ambience, the first contrast processing unit 124 sets the characteristic 509 and the second contrast processing unit 125 sets the characteristic 502. Further, the first color correction processing unit 126 sets the hue characteristics 711 and 713, and the second color correction processing unit 127 sets the gain characteristic 702 in relation to the characteristic 703. As a result, the image quality characteristic for causing the "nature landscape" to appear "soft and gentle" can be applied.

As described above, in the present exemplary embodiment, by allowing the user to select three types of settings, i.e., the setting for the scene to be photographed, the object state, and the finishing, the image processing for the finishing of the photograph desired by the user is executed according to the shooting condition and the image processing parameters applied in interlock with one another. With the above-described configuration, the present exemplary embodiment can easily finish a photograph at a desired image quality with an extended expression range even if the user is not very conversant with digital image processing in expressing and finishing a photograph as desired by the user.

In the present exemplary embodiment, for the setting executed according to the selected photograph finish ambience, the same characteristic can be applied regardless of the result of other user selections. If the "soft and gentle" has been selected, the characteristic 502 is set to the second contrast processing unit 125.

However, the present exemplary embodiment is not limited to the above-described configuration. More specifically, the characteristics applied to the contrast processing unit and the color correction processing unit can be different between a case where the "soft and gentle" has been set when the "nature landscape" is set as the shooting object and a case where the "soft and gentle" mode has been set when the "city landscape" is set as the shooting object. With the above-described configuration, the present exemplary embodiment can achieve a photograph finished substantially as desired by the user because one selection result can very organically to other selection results.

Similar to the first exemplary embodiment, a second exemplary embodiment determines the image processing parameters by allowing the user to select three types of settings, i.e., the setting for the scene to be photographed, the object state, and the finishing. By restricting the alternatives for other selection items according to the result of selecting the specific selection items, the present exemplary embodiment readily guides the user to implement the finishing of a photograph without confusion.

Figure 4:
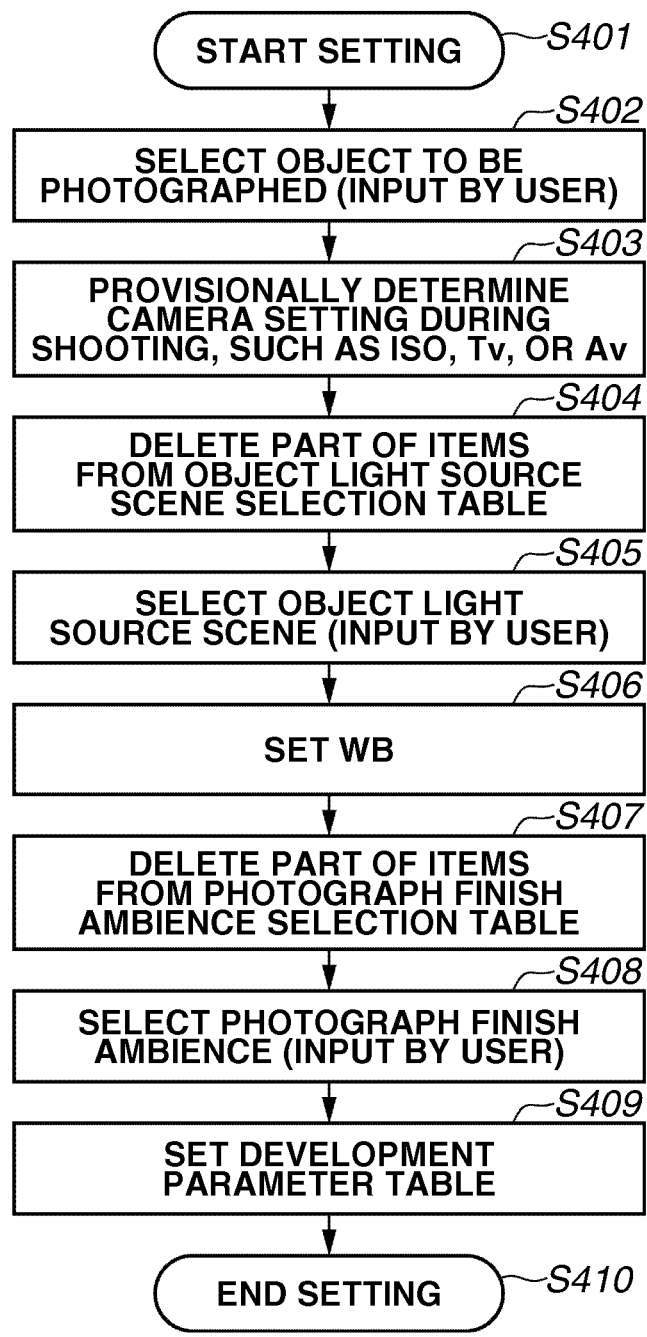
FIG. 4 is a flow chart illustrating an exemplary flow of processing according to the second exemplary embodiment.

In processing in steps S402 and S403 illustrated in FIG. 4, the user selects a shooting object from among those included in a list illustrated in FIG. 9A, similarly to the processing in steps S302 and S303 in the first exemplary embodiment. In addition, the user sets the aperture value AV, the shutter speed TV, and the ISO sensitivity by operating the shooting object selection unit 118 via the user input unit 117 illustrated in FIG. 1B.

In step S404, before selecting the object light source state, items included in the list of object light source states are selected according to a signal 130 corresponding to the selected shooting object.

More specifically, as illustrated in FIG. 11A, a combination of the object light source states that is not normally used is previously deleted from the list of the object light source states according to the selected shooting object. The list including the remaining object light source states is displayed.

For example, if the "nature landscape" has been selected as the shooting object, items, such as "fluorescent lamp", "white light-emitting diode (LED)", "tungsten filament lamp", "mercury lamp", and "flame", among the items included in the list of object light source states, are not to be displayed on the user interface.

In step S406, as described above, in shooting a photograph of a "nature landscape", the present exemplary embodiment inhibits the user from setting a white balance for the color temperature of an artificial light source or flames and allows the user to select an object light source state from among the remained items.

In step S407, the white balance control value setting unit 122 prepares a white balance control value according to the object light source state selected and set by the user.

In step S408, before selecting the photograph finish ambience, items included in the list of photograph finish ambiences are selected according to the signal 130 corresponding to the selected shooting object similar to the processing for selecting the items of the object light source states.

More specifically, as illustrated in FIG. 11B, a combination of photograph finish ambiences that is not normally used is previously deleted from the list of the photograph finish ambiences according to the selected shooting object and the list including the remaining photograph finish ambiences is displayed.

For example, if the "sports" has been selected as the shooting object, the "soft and gentle" is deleted from the items of photograph finish ambiences included in the list and is not to be displayed on the user interface.

In the above-described manner, in shooting a photograph of a "sport" scene, the present exemplary embodiment can prevent finishing of the photograph to have a "soft and gentle" ambience. In step S409, the user selects the photograph finish ambience from among the remaining items.

In step S410, the image processing parameter setting unit 123 sets each image processing parameter to the contrast processing unit 112, the sharpness processing unit 113, and the color correction processing unit 114 according to the selected photograph finish ambience.

By using the set parameters, the photographed image data is developed and output by the image output unit 116.

In the present exemplary embodiment, the user selects the shooting object, the object light source state, and the photograph finish ambience in this order. However, the order of executing the three selections is not limited to this. More specifically, the user can execute the three selections in a different order. If the user has executed the selection starting from selecting the object light source state, selection items of the shooting object and the photograph finish ambience are restricted according to the signal 131 corresponding to the selected object light source state. Similarly, if the user has started the selection from the photograph finish ambience, the selection items of the shooting object and the object light source state are restricted according to a signal 132 corresponding to the selected photograph finish ambience.

As described above, in the present exemplary embodiment, the alternatives for the state of the light source that illuminates the object with light and the alternatives for the photograph finish ambience are restricted according to the selected shooting object. Accordingly, the present exemplary embodiment can readily guide the user to more easily and effectively implement the finishing of a photograph without getting confused.

In the present exemplary embodiment, the alternatives for the light source state and the finish ambience are restricted according to the selected shooting object. However, the alternatives for the shooting object and the photograph finish ambience can be restricted according to the selected object light source state. Further, the alternatives for the shooting object and the object light source state can be restricted according to the selected photograph finish ambience.

Aspects of the present invention can also be realized by a computer of a system or apparatus (or devices such as a central processing unit (CPU) or a micro processing unit (MPU)) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-185291 filed Aug. 20, 2010, which is hereby incorporated by reference herein in its entirety.

What is claimed is:

1. An imaging apparatus comprising:
an imaging unit configured to photograph an image of an object;
a first selection unit configured to select an object to be photographed from among predetermined alternatives;
a second selection unit configured to select an environment in which the object is illuminated by a light source with light from among predetermined alternatives;
a third selection unit configured to select a feeling of a finished image from among predetermined alternatives;
a first setting unit configured to set a photographing condition used for one time photographing according to results of the selection by the first, the second, and the third selection units;
a control unit configured to control the imaging unit according to the photographing condition set by the first setting unit;
a second setting unit configured to set an image processing parameter used in image processing to be executed on image data obtained by one time photographing by the imaging unit according to the results of the selection by the first, the second, and the third selection units; and
an image processing unit configured to execute image processing on the image data photographed by the imaging unit using the image processing parameter set by the second setting unit,
wherein the first and the second setting units are configured, based on a result of the selection by at least one of the first, the second, and the third selection units, to change a content of a setting to be executed according to results of the selection by the other selection units.

2. An imaging apparatus comprising: an imaging unit configured to photograph an image of an object;
a first selection unit configured to select an object to be photographed from among predetermined alternatives;
a second selection unit configured to select an environment in which the object is illuminated by a light source with light from among predetermined alternatives;
a third selection unit configured to select a feeling of a finished image from among predetermined alternatives;
a first setting unit configured to set a photographing condition according to results of the selection by the first, the second, and the third selection units;
a control unit configured to control the imaging unit according to the photographing condition set by the first setting unit;
a second setting unit configured to set an image processing parameter used in image processing to be executed on image data photographed by the imaging unit according to the results of the selection by the first, the second, and the third selection units;
an image processing unit configured to execute image processing on the image data photographed by the imaging unit using the image processing parameter set by the second setting unit; and
a changing unit configured, with respect to each item to be selected by each of the first, the second, and the third selection units and according to a result of the selection by one of the selection units, to change an item to be selected by at least one of the other two selection units.

3. A method for controlling an imaging apparatus including an imaging unit configured to photograph an image of an object and an image processing unit configured to execute image processing on image data photographed by the imaging unit, the method comprising:
executing a first selection for selecting an object to be photographed from among predetermined alternatives;

executing a second selection for selecting an environment in which the object is illuminated by a light source with light from among predetermined alternatives;

executing a third selection for selecting a feeling of a finished image from among predetermined alternatives;

executing a first setting for setting a photographing condition used for one time photographing according to results of the first, the second, and the third selections;

controlling the imaging unit according to the photographing condition set by the first setting;

executing a second setting for setting an image processing parameter used in image processing to be executed on image data obtained by one time photographing by the imaging unit according to the results of the first, the second, and the third selections; and executing image processing on the image data photographed by the imaging unit using the image processing parameter set by the second setting, wherein, in the first and the second settings, based on a result of at least one of the first, the second, and the third selections, a content of a setting to be executed according to results of the other selections is changed.

* * * * *